US006072547A

United States Patent [19]

Sluyterman

[11] Patent Number: 6,072,547

[45] Date of Patent: Jun. 6, 2000

[54] COLOR DISPLAY DEVICE

[75] Inventor: Albertus A. S. Sluyterman, Eindhoven, Netherlands

[73] Assignee: U.S. Philips Corporation, New York, N.Y.

[21] Appl. No.: 08/857,548

[22] Filed: May 16, 1997

[30] Foreign Application Priority Data

May 21, 1996 [EP] European Pat. Off. .............. 96201379

[51] Int. Cl.[7] .................................................... H04N 17/00

[52] U.S. Cl. .......................... 348/807; 348/805; 315/370

[58] Field of Search .................................... 348/807, 805, 348/806, 841, 180; 315/368.11, 368.12, 399, 370; H04N 17/00

[56] References Cited

U.S. PATENT DOCUMENTS

| | | | |
|---|---|---|---|
| 3,930,185 | 12/1975 | Barkow et al. | 315/368.26 |
| 4,160,935 | 7/1979 | Groot et al. | 315/370 |
| 4,201,932 | 5/1980 | Smith | 315/368.27 |
| 4,654,615 | 3/1987 | McGlashan | 335/211 |
| 4,654,616 | 3/1987 | Dodds et al. | 335/212 |
| 4,749,918 | 6/1988 | Fischer | 315/368.26 |
| 4,894,593 | 1/1990 | Barten | 315/368.26 |
| 5,027,042 | 6/1991 | Sluyterman et al. | 315/368.11 |
| 5,099,169 | 3/1992 | Vriens | 313/403 |
| 5,306,982 | 4/1994 | Maillot et al. | 313/413 |
| 5,408,159 | 4/1995 | Maillot et al. | 313/440 |
| 5,521,463 | 5/1996 | Ogawa et al. | 313/440 |
| 5,583,401 | 12/1996 | Inoue et al. | 315/370 |
| 5,644,196 | 7/1997 | George | 315/368.18 |
| 5,801,496 | 9/1998 | Takita | 315/368.11 |

*Primary Examiner*—John K. Peng
*Assistant Examiner*—Jean W. Désir
*Attorney, Agent, or Firm*—Robert J. Kraus

[57] ABSTRACT

A color display device having a color display tube with a display screen, comprising an electron gun for generating three co-planar electron beams, and a deflection system which, in operation, generates deflection fields for scanning the display screen, and an element influencing the landing angle of the outermost beams, for example an element generating, in operation, a 45° magnetic 4-pole field, and comprising a correction device which supplies a signal to the element influencing the landing angle, which signal is derived from the video information (for example a signal which is proportional to the strength of the instantaneous beam current) in order to remedy landing errors caused by space-charge repellence between beams.

12 Claims, 4 Drawing Sheets

COLOR DISPLAY DEVICE

BACKGROUND OF THE INVENTION

The invention relates to a color display device comprising a color display tube on a longitudinal axis of which there is arranged:

a) a neck, a cone, a display screen provided with an arrangement of phosphor dots luminescing in different colors, and a color selection electrode which is situated opposite said display screen.

b) the neck accommodates an electron gun having a beam-forming part for generating three electron beams which are to be driven by video information and the axes of which extend in one plane, and c) a deflection unit for generating deflection fields which serve to deflect the electron beams in the horizontal and vertical directions, which deflection unit defines a deflection plane.

Color display tube systems of the type mentioned in the opening paragraph are of the conventional 3-in-line type. In general, they comprise a self-convergent deflection unit which, in operation, generates such non-uniform magnetic fields for horizontal and vertical deflection (in particular a barrel-shaped field for vertical deflection and a cushion-shaped field for horizontal deflection) that the three electron beams generated by the electron gun and focused on the display screen by the main lens converge throughout the display window.

Nowadays ever higher beam currents are required, which can be partly attributed to the use of darker glass. A problem associated with said higher beam currents is that the beams repel each other, so that it is impossible to provide a perfect picture for all beam-current values. In addition, the picture performance must meet ever stricter requirements.

The problem is being dealt with, for example, by correcting convergence errors caused by space-charge repellence or by precluding space-charge repellence by making sure that the three beams do not coincide with respect to time.

The invention is based on the recognition that space-charge repellence between the beams does not only cause a convergence error but also a landing error. If the convergence error caused by space-charge repellence is corrected, the landing is adversely affected and cannot be corrected. To optimize the correction, first the landing influences of space-charge repellence must be corrected, whereafter it is possible to correct, if necessary, the convergence which may have been adversely affected by said correction.

The expression "correct landing" is to be understood to mean in this context a correct landing angle. The three electron beams which must drive the phosphor dots of a specific pixel must pass through the same mask hole) of the color selection electrode (shadow mask) at slightly different, predetermined angles. Space-charge repellence experienced by the (outermost) beams has a disturbing effect on these angles. It is an object of the invention to correct the space-charge influence which affects the landing angles.

This object is achieved by a color display tube system in accordance with the invention, which is characterized in that an element influencing the landing angle so as to correct the effect of space-charge repellence experienced by the (outermost) beams is provided in an axis-position between the axis-positions of the beam-forming part of the electron gun and the display screen. The correcting operation can be carried out in various ways. It is possible, for example, to measure the cathode currents or beam currents, and to derive from the measured information information how to energize the element for influencing the landing angle. A very practical solution is deriving the information from the video information.

A preferred embodiment in accordance with the invention is characterized, in that a correction device is provided which supplies a correction signal to the element influencing the landing angle, said correction signal being derived from the video information.

In this preferred embodiment, a number of drive modes are possible. The correction signal can be derived from the instantaneous video information (this requires a rapid correction circuit). The correction signal can be derived from the average beam current per line (to start from the correct line, a line memory is necessary). The correction signal can be derived from the average beam current per picture (which is known from the preceding picture or pictures).

All this is based on the following. If the value of all beam currents to be used is known, then the mutual repellence of the beams can be calculated for all these beam currents. If the mutual repellence is known, then the degree to which the landing angle is influenced is known too. This can be used to determine the necessary correction signal. By supplying said correction signal to the element influencing the landing angle, the outermost electron beams experience, during operation, a force causing these electron beams to be displaced relative to the central beam. This correction signal is adjusted such that the effect on the landing angle of the electron beams substantially compensates for the effect of beam repellence. The object of the invention is achieved in that the arrangement of the element influencing landing in an axis-position between the display screen and the deflection plane, causes the element to exert a force, in the case of a correction, on the outermost electron beam(s), which force comprises a component extending in the plane of the electron beams and in a direction towards the central electron beam, and the arrangement of the element influencing landing in an axis-position between the deflection plane and the beam-forming part of the gun, causes the element to exert a force, in the case of correction, on the outermost electron beam(s), which force comprises a component extending in the plane of the electron beams and in a direction away from the central electron beam. In the latter case, the sensitivity of the correction system is the highest (which means that the drive currents necessary are the lowest).

The magnetic fields to be generated for the desired influencing processes may be local dipole fields at the location of each one of the two outer beams.

To ensure that the electron beams can be focused to a sufficient degree, a preferred embodiment of the invention is characterized in that the element influencing the landing angle is constructed in such a way as to generate a 45° magnetic 4-pole field. (Particularly if said element is arranged near the focusing lens of the electron gun).

These and other aspects of the invention will be apparent from and elucidated with reference to the embodiments described hereinafter.

BRIEF DESCRIPTION OF THE DRAWING

In the drawings.

The same reference numerals refer to the same parts, whenever possible.

DESCRIPTION OF THE PREFERRED EMBODIMENTS

Figure 1:
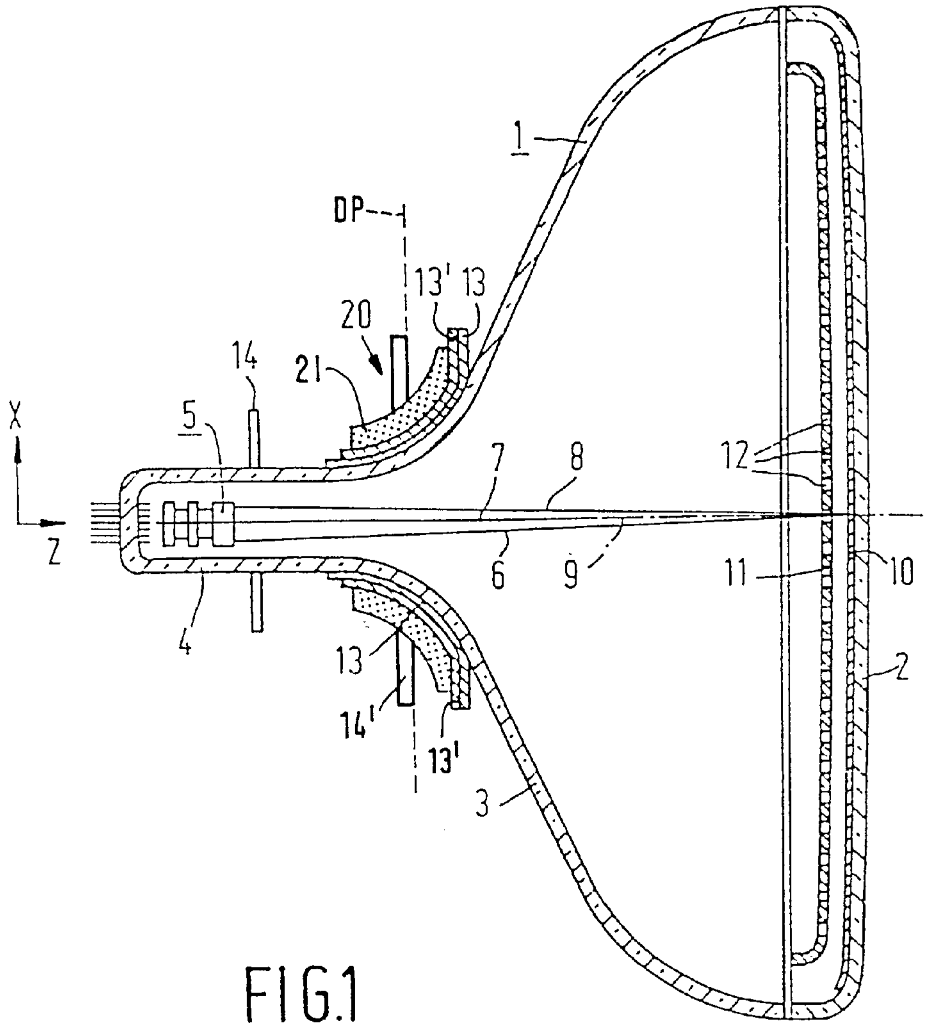
FIG. 1 is a longitudinal sectional view of a color display tube having an element 14 which influences the landing angle.

FIG. 1 is a sectional view of a color display tube for use in a display device in accordance with the invention. In a glass envelope 1, which is composed of a display window 2, a cone 3 and a neck 4, said neck accommodates an electron gun 5, which generates three electron beams 6, 7 and 8 whose axes are in the plane of the drawing. In the undeflected state, the axis of the central electron beam 7 coincides with the longitudinal axis 9 of the tube. The inner surface of the display screen 2 is provided with a large number of triads of phosphor elements. Said elements may be in the form of lines or dots. Each triad comprises an element consisting of a phosphor luminescing in green, an element consisting of a phosphor luminescing in blue, and an element consisting of a phosphor luminescing in red. Opposite the display screen, there is provided a shadow mask 11 having a large number of apertures 12 for allowing passage of the electron beams 6, 7 and 8, which each impinge on phosphor elements of only one color. The three coplanar electron beams are deflected by means of a deflection unit 20 which comprises a line-deflection coil system 13 and a field deflection coil system 13' as well as a ring core 21 which coaxially surrounds at least the line-deflection coil system 13.

An aspect of the invention relates to the generation of a correction-magnetic field by means of a landing-correction element, which correction-magnetic field has a strength which is derived from (for example proportional to) the beam current and a field configuration which, depending on whether the correction element is situated in front of or behind the deflection plane DP, causes the electron beams 6 and 8 to move in a direction away from the central beam or towards the central beam, in the plane of the electron beams.

The magnetic field configurations to be used may comprise local dipole fields which are generated, at the location of the outer beams 6 and 8, by means of coil configurations. If necessary, magnetic pole pieces (not shown) may be arranged in the neck 4 of the tube so as to lead the dipole fields to the correct places. However, a disadvantage of the use of (metallic) pole pieces is that eddy currents may occur when high-frequency line-deflection fields are used.

Figure 2:
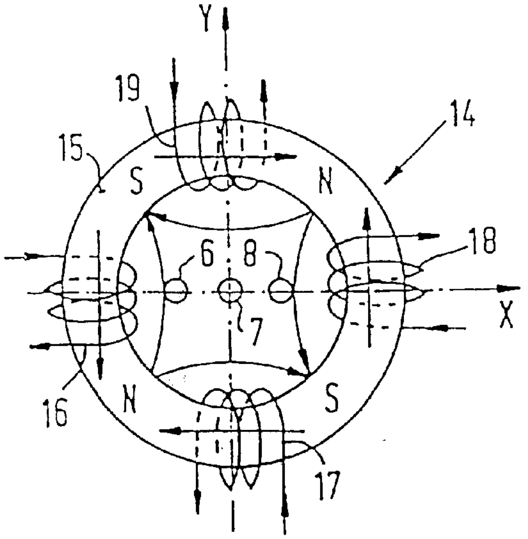
FIG. 2 is an elevational view of an element 14 of the color display tube shown in FIG. 1, which element influences the landing angle and is implemented as a 45° 4-pole.

The use of pole pieces can be dispensed with if the magnetic field configuration to be used comprises a 45° quadrupole field. Such quadrupole fields can be generated by means of a system of four coils 16, 17, 18, 19 which are wound on a core, as shown in FIG. 2.

As shown in FIG. 1, element 14 which, in said Figure, is situated at an axis-position between the beam-forming part of gun 5 and deflection plane DP, comprises a ring core 15 of a magnetizable material, which coaxially surrounds the neck of the tube 4 and on which the four coils 16, 17, 18 and 19 are wound in such a manner that, upon excitation, a 45° 4-pole field is generated, whose orientation relative to the three beams 6, 7 and 8 corresponds to that shown in the drawing. (A 45° magnetic 4-pole field can alternatively be generated by means of two C-cores which are provided with a winding, as shown in FIG. 5, or with a stator construction as shown in FIG. 6).

Figure 3:
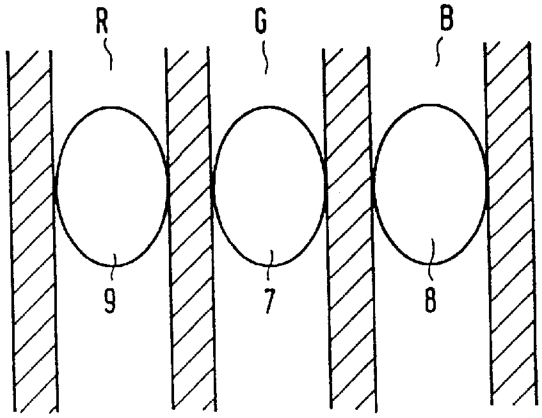
FIGS. 3 and 4 show landing aspects of the three beams.
Figure 4:
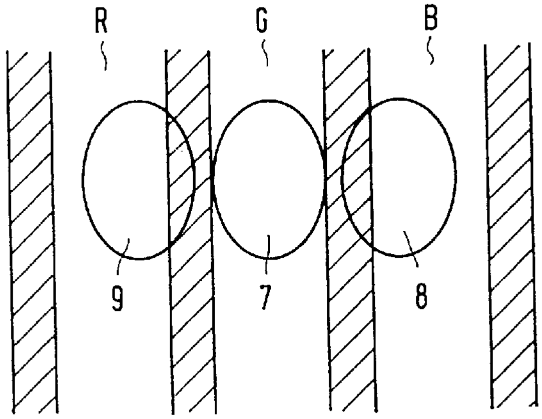
Figure 5:
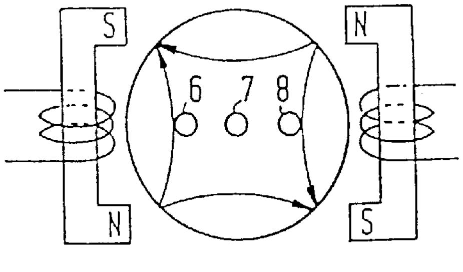
FIGS. 5 and 6 are elevational views of alternative embodiments of 45° magnetic 4-pole elements.
Figure 6:
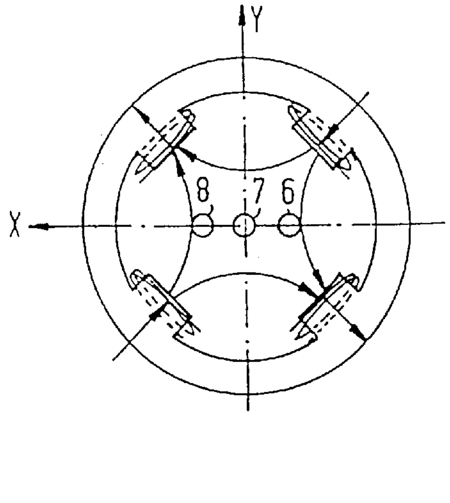

The aspect of landing correction on which the invention is based is explained by means of FIGS. 3, 4 and 5.

FIG. 3 is an elevational view of a part of the display screen 2 on which a repeating pattern of parallel red, green and blue phosphor strips R, G, B is provided, with so-called safety zones (hatching lines) being situated between the phosphor strips. If the outer beams are not subject to the effect of space-charge repellence, the spots of the beams 7, 8 and 9 are incident on the strips R, G, B in an identical manner, i.e. the picture has a high color purity. Said color purity is maintained if the three spots are subject to an equal displacement in the same direction. (This may take place, for example, in the case of doming of the mask).

FIG. 4 shows a situation in which the outer beams have undergone the effect of space-charge repellence. In this case, if the spots 7, 8 and 9 are subject to an equal displacement in the same direction, discoloration will take place.

Figure 7:
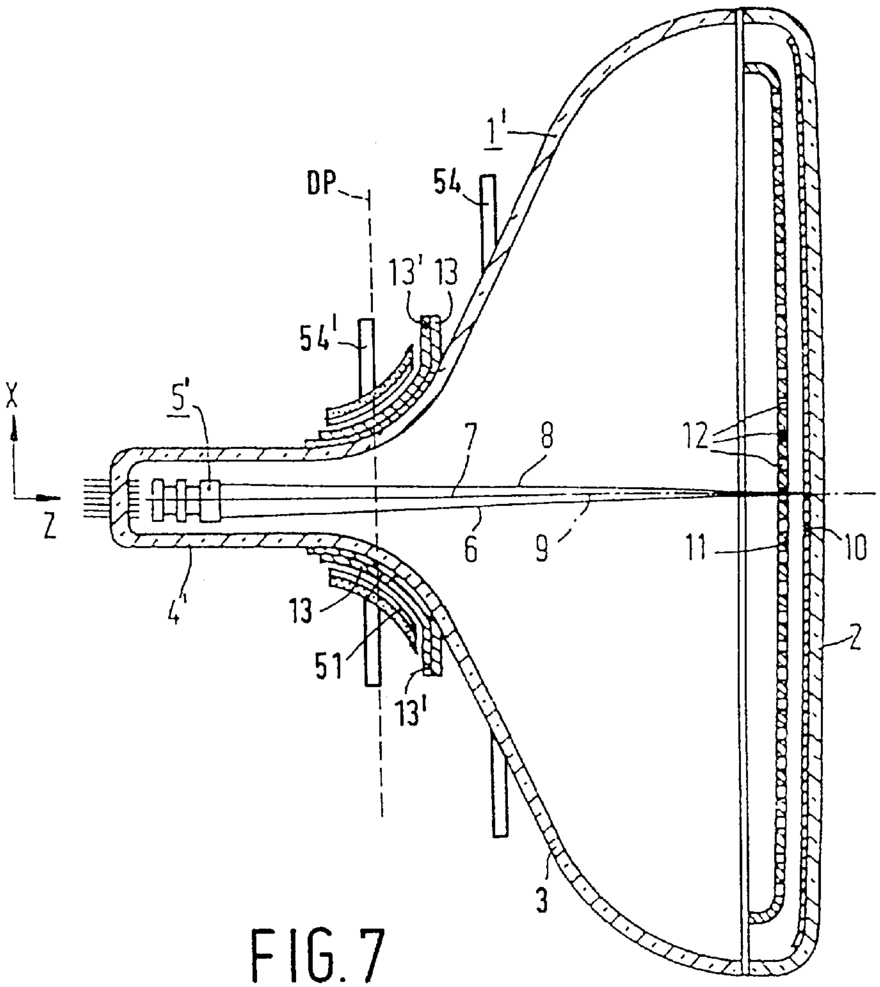
FIG. 7 is a longitudinal sectional view of a color display tube having an element 54 influencing the landing angle, which is implemented as a 45° 4-pole.
Figure 8:
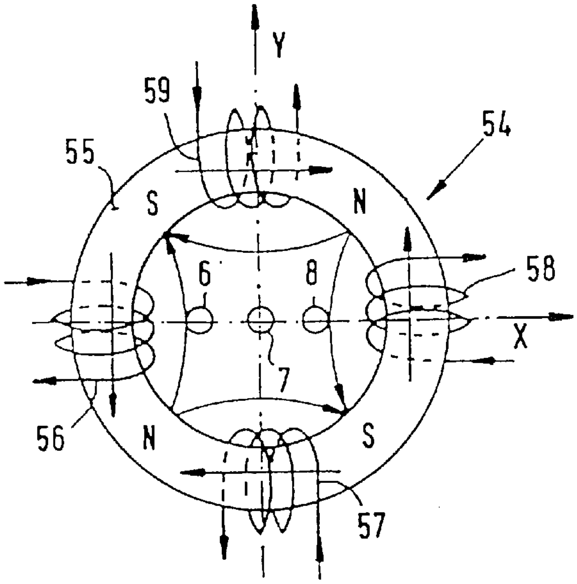
FIG. 8 is a perspective view of the element 54.

FIG. 7 shows an alternative embodiment of a color display tube for a display device in accordance with the invention. In this case, the tube comprises an element 54 for influencing the landing angle, which element is situated between the display screen 2 and the deflection plane DP, and which serves to cause the outermost electron beams to move towards each other. In this case, element 54 comprises a coil configuration 56, 57, 59, 59, which is provided on a ring core 55 (FIG. 8 is not drawn to scale). The current running through the coils 56, 57, 58, 59 can be derived from the beam current.

Figure 9:
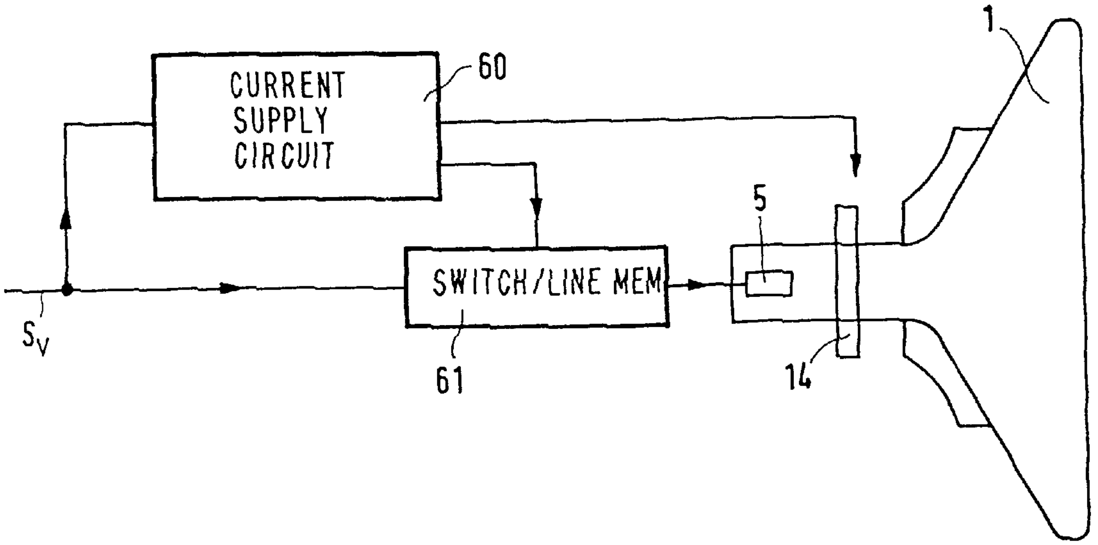
FIG. 9 schematically shows an embodiment of the invention.

After the correction of landing errors caused by space-charge repellence, the possible deterioration in convergence caused by said correction can be remedied by means of a line memory for each one of the three colors, the reading rate for each of the three colors being determined such that the convergence (deteriorated due to the landing angle correction) is corrected. Such a system is diagrammatically shown in FIG. 9. In said Figure, $S_V$ represents an incoming video signal. The current to be supplied to the 45° 4-pole 14 (or 54) is calculated from this signal in circuit 60. In addition, video information is supplied to a switch 61 having a line memory for each one of the three colors. The necessary clock rates are derived from circuit 60 and the resultant video signals are supplied to the tube 1 or 1'.

Instead of three line memories for correcting convergence errors, use can be made of an element (14' or 54') which generates a 45° magnetic 4-pole field, which element is preferably arranged near or in the deflection plane. If it is arranged in the deflection plane, it has no influence on the landing. In other cases, it may be necessary to correct the landing more strongly than would be necessary if convergence correction is left out.

It is even possible to carry out both corrections (landing-angle correction and convergence correction) with one 45° quadrupole, which is arranged in front of the deflection plane.

In summary, the invention relates to a color display device having a color display tube with a display screen, comprising an electron gun for generating three co-planar electron beams, and a deflection system which, in operation, generates deflection fields for scanning the display screen, and an element influencing the landing angle of the (outermost)

beams, for example an element generating, in operation, a 45° magnetic 4-pole field, and comprising a correction device which supplies a signal to the element influencing the landing angle, which signal is derived from the video information (for example a signal which is proportional to the strength of the instantaneous beam current—cathode current—) in order to remedy landing errors caused by space-charge repellence between beams.

I claim:

1. A color display device comprising a color display tube on a longitudinal axis of which there is arranged:

a) a neck, a cone, a display screen provided with an arrangement of phosphor elements for luminescing in different colors, and a color selection electrode which is situated opposite said display screens;

b) an electron gun disposed in the neck and having a beam-forming part for responding to video information while generating central and first and second outer electron beams directed toward said display screen the axes of which extend in one plane; and c) a deflection unit for generating deflection fields which serve to deflect the electron beams across the display screen, which deflection unit defines a deflection plane, characterized in that an element for influencing the beam-landing angles at the phosphor elements to correct beam-landing errors from the effect of space-charge repellence experienced by the first and second outer beams is located at an axial position between the axial positions of the beam-forming part of the electron gun and the display screen.

2. A display device as claimed in claim 1, characterized in that a correction device is provided which supplies a correction signal to the element influencing the landing angle, said correction signal being derived from the video information.

3. A color display tube system as claimed in claim 1, characterized in that the element influencing the landing angle is constructed in such a way as to generate a 45° magnetic 4-pole field.

4. A display device as claimed in claim 2, characterized in that the correction signal is derived from instantaneous video information.

5. A display device as claimed in claim 2, characterized in that the correction signal is derived from the average beam current per line.

6. A display device as claimed in claim 2, characterized in that the correction signal is derived from the average current per picture.

7. A display device as claimed in claim 1, characterized in that the element influencing the landing angle is arranged in an axis position between the deflection plane and the display screen, and, in the case of correction, said element exerts a force on the outer electron beams, which force comprises a component extending in the plane of the electron beams and in a direction towards the central electron beam.

8. A display device as claimed in claim 1, characterized in that the element influencing the landing angle is arranged in an axis position between the deflection plane and the beam-forming part of the electron gun, and, in the case of correction, said element exerts a force on the outer electron beams, which force comprises a component extending in the plane of the electron beams and in a direction away from the central beams.

9. A display device as claimed in claim 1, characterized in that the device also comprises a convergence-correction device which serves to correct any convergence errors after correction of the landing errors.

10. A display device as claimed in claim 9, characterized in that the convergence-correction device comprises a convergence-influencing element which is constructed in such a way as to generate, in operation, a 45° magnetic 4-pole field.

11. A display device as claimed in claim 10, characterized in that the convergence-influencing element is arranged in or near the deflection plane.

12. A display device as claimed in claim 9, characterized in that the convergence-correction device comprises a line memory for the video information of each one of the three electron beams, as well as a device which causes the reading operations of the three line memories to take place at slightly different times.

* * * * *